(12) United States Patent
Simpson et al.

(10) Patent No.: US 11,493,460 B2
(45) Date of Patent: Nov. 8, 2022

(54) BACK-REFLECTION LAUE DETECTOR AND METHOD OF OPERATING THE SAME

(71) Applicant: PROTO PATENTS LTD., LaSalle (CA)

(72) Inventors: Brian Simpson, LaSalle (CA); Robert Drake, Tecumseh (CA)

(73) Assignee: PROTO PATENTS LTD., LaSalle (CA)

( * ) Notice: Subject to any disclaimer, the term of this patent is extended or adjusted under 35 U.S.C. 154(b) by 0 days.

(21) Appl. No.: 17/279,405

(22) PCT Filed: Sep. 25, 2019

(86) PCT No.: PCT/CA2019/051370
§ 371 (c)(1),
(2) Date: Mar. 24, 2021

(87) PCT Pub. No.: WO2020/061695
PCT Pub. Date: Apr. 2, 2020

(65) Prior Publication Data
US 2022/0003692 A1 Jan. 6, 2022

Related U.S. Application Data

(60) Provisional application No. 62/736,541, filed on Sep. 26, 2018.

(51) Int. Cl.
*G01N 23/207* (2018.01)
*G01N 23/20008* (2018.01)

(52) U.S. Cl.
CPC ..... *G01N 23/207* (2013.01); *G01N 23/20008* (2013.01); *G01N 2223/056* (2013.01); *G01N 2223/507* (2013.01)

(58) Field of Classification Search
CPC .......... G01N 23/207; G01N 23/20008; G01N 2223/056; G01N 2223/507; G01N 2223/053
See application file for complete search history.

(56) References Cited

U.S. PATENT DOCUMENTS

| 4,709,384 A | 11/1987 | Schiller |
| 2010/0142679 A1 | 6/2010 | Bilderback |

FOREIGN PATENT DOCUMENTS

| CN | 105628721 | 6/2016 |
| JP | S50150480 | 12/1975 |

(Continued)

OTHER PUBLICATIONS

Translation of JP2007218605 A (Year: 2007).*
(Continued)

*Primary Examiner* — David P Porta
*Assistant Examiner* — Mamadou Faye
(74) *Attorney, Agent, or Firm* — Almanac IP Advisors LLP

(57) ABSTRACT

A back-reflection Laue apparatus and a method are provided. The apparatus includes a source for generating X-ray radiation, a collimator for collimating the X-ray radiation into an X-ray beam; a back-reflection Laue chamber for transmitting the beam therethrough towards a sample, and back-reflecting visible radiation obtained from the beam being diffracted off the sample and converted to visible radiation upon re-entering the chamber, the chamber comprising a reflection side wall having an exterior surface and a reflective interior surface for back-reflecting the visible radiation, the wall being provided with a through-hole extending from the exterior surface to the reflective interior surface; and a detector assembly for detecting the back-reflected visible radiation. The collimator has a first end connected to the source and a second end terminating between the exterior (Continued)

surface and the reflective interior surface of the wall, within the through-hole, the beam exiting the collimator at the second end.

21 Claims, 7 Drawing Sheets

(56) References Cited

FOREIGN PATENT DOCUMENTS

| | | |
|---|---|---|
| JP | 2007218605 | 8/2007 |
| JP | 2007218605 A * | 8/2007 |
| JP | 2007285993 | 11/2007 |

OTHER PUBLICATIONS

International Search Report for PCT/CA2019/051370 dated Nov. 14, 2019. (3 pages).
Written Opinion for PCT/CA2019/051370 dated Nov. 14, 2019. (3 pages).
International Preliminary Report on Patentability for PCT/CA2019/051370 dated Mar. 23, 2021. (4 pages).
Extended European Search Report for EP 19865781.9 dated May 11, 2022 (7 pages).

* cited by examiner

BACK-REFLECTION LAUE DETECTOR AND METHOD OF OPERATING THE SAME

CROSS-REFERENCE TO RELATED APPLICATIONS

This application is the National Stage of International Application No. PCT/CA2019/051370 filed Sep. 25, 2019, which claims the benefit of U.S. Provisional Application No. 62/736,541 filed Sep. 26, 2018, the contents of which are incorporated herein by reference.

FIELD

The technical field generally relates to a method and system of X-ray diffraction, and more particularly relates to a method and system for back-reflection Laue X-ray diffraction.

BACKGROUND

Laue diffraction is used to measure crystal orientation. One difference between a Laue diffraction diffractometer and a traditional powder diffractometer is that Bremsstrahlung radiation is used instead of a monochromatic beam. There are two ways of performing X-ray diffraction using Laue images. In transmission Laue systems, the film or X-ray detector is placed behind the crystal to record X-ray beams which are transmitted through the crystal. In back-reflection Laue systems, also generally referred to herein as "back-reflection Laue systems" or "back-reflection X-ray detectors", the actual film or X-ray detector is placed between the X-ray source and the crystal. Thus, the X-ray beams which are diffracted in a backwards direction are recorded. The X-ray source/crystal/detector arrangement of back-reflection Laue systems also typically provides for a compact size relative to a transmission Laue system.

Over the past decades, back-reflection X-ray diffraction has increased in importance, particularly in the area of electronic devices that incorporate non-linear optical and piezoelectric single crystal materials, and the like. It can therefore be important that X-ray detectors be able to conveniently obtain and analyze Laue images to determine crystal orientation for various industrial applications. The relatively compact nature of back-reflection Laue systems renders them suitable for numerous applications. However, there are several drawbacks in existing back-reflection Laue systems.

In some of the existing single-camera back-reflection Laue systems, the X-ray radiation exiting the X-ray source is passed through a collimator that can collimate the X-ray into a low divergent beam. The collimator typically passes through a hole provided in the mirror of the reflection chamber and extends well into the reflection chamber. This typically impacts the measurements in that the presence of the collimator inside the reflection chamber creates a shadow region (or in other words, the collimator hides some of the Laue spots).

One way of avoiding the shadow from the collimator is the use of twin-camera back-reflection Laue systems. However, this configuration is typically more expensive and less compact than single-camera back-reflection Laue systems.

Another way of reducing this drawback is described in Japanese patent application JP 2007-218605, where the collimator of the single-camera back-reflection Laue system is positioned in proximity to the mirror surface and outside of the reflection chamber. However, this design has other drawbacks. For example, the gap between the end of the collimator and the aperture provided in the mirror can allow for external light to disrupt the measurement. The collimator terminating before the aperture can also give a more divergent beam. Another drawback is that this configuration does not allow for modifying the diameter or shape of the X-ray beam exiting the collimator as the X-ray beam passes through the hole.

In view of the above, many challenges still exist in the field of back-reflection Laue systems.

SUMMARY

In one aspect, there is provided a back-reflection Laue apparatus, comprising: an X-ray source for generating X-ray radiation; a collimator for collimating the X-ray radiation into an X-ray beam; a back-reflection Laue chamber for transmitting the X-ray beam therethrough towards a sample, and back-reflecting visible radiation obtained from the X-ray beam being diffracted off the sample and converted to visible radiation upon re-entering the back-reflection Laue chamber, the back-reflection Laue chamber comprising a reflection side wall having an exterior surface and a reflective interior surface for back-reflecting the visible radiation, the reflection side wall being provided with a through-hole extending from the exterior surface to the reflective interior surface; and a detector assembly for detecting the back-reflected visible radiation, wherein the collimator has a first end connected to the X-ray source and a second end terminating between the exterior surface and the reflective interior surface of the first side wall, within the through-hole, the X-ray beam exiting the collimator at the second end thereof.

In some embodiments, the second end of the collimator terminates at the exterior surface of the reflection side wall.

In some embodiments, the second end of the collimator terminates at the reflective interior surface of the reflection side wall.

In some embodiments, the second end of the collimator terminates strictly between the exterior surface and the reflective interior surface of the reflection side wall.

In some embodiments, the second end of the collimator terminates substantially in the middle of the through-hole.

In some embodiments, the second end of the collimator is provided with an aperture adaptor for modifying the diameter and/or shape of the X-ray beam.

In some embodiments, the collimator is part of a collimator assembly comprising a collimator holder attached to the back-reflection Laue chamber and configured to receive the collimator therein such that the collimator and the through-hole are aligned.

In some embodiments, the collimator is slidably engageable into the collimator holder.

In some embodiments, the collimator holder is connected to the back-reflection Laue chamber at a substantially 45-degree angle with regard to the reflective interior surface.

In some embodiments, the collimator is housed in a tube extending from the X-ray source to the collimator holder, the collimator being slidably engageable into the collimator holder by sliding the tube into the collimator holder.

In some embodiments, the collimator assembly further comprises a guide protruding from the exterior surface of the reflection side wall and configured to surround an end portion of the collimator and the collimator holder to prevent external light from entering the back-reflection Laue chamber.

In some embodiments, the reflective interior surface comprises a reflective metal layer.

In some embodiments, the reflective metal layer is selected from the group consisting of an aluminum layer and a silver layer.

In some embodiments, the detector assembly comprises a first lens for focusing the back-reflected visible radiation, and a camera to detect the focused visible radiation.

In some embodiments, the back-reflection Laue apparatus further includes an image intensifier to intensify the focused visible radiation, and a second lens to refocus the intensified visible radiation, the image intensifier and the second lens being positioned between the first lens and the camera. Alternatively, the second lens can be replaced by a fiber-optically coupled camera.

In some embodiments, the camera is a CCD camera or a CMOS camera.

In another aspect, there is provided a back-reflection Laue method, comprising: generating X-ray radiation with an X-ray source; collimating the X-ray radiation into an X-ray beam with a collimator; in a back-reflection Laue chamber comprising a reflection side wall having an exterior surface and a reflective interior surface: transmitting the X-ray beam through the back-reflection Laue chamber and towards a sample; back-reflecting, with the reflective interior surface, visible radiation obtained from the X-ray beam being diffracted off the sample and converted to visible radiation upon re-entering the back-reflection Laue chamber, the reflection side wall being provided with a through-hole extending from the exterior surface to the reflective interior surface; and detecting the back-reflected visible radiation with a detector, wherein the collimator has a first end connected to the X-ray source and a second end terminating between the exterior surface and the reflective interior surface of the first side wall, within the through-hole, the X-ray beam exiting the collimator at the second end thereof.

In some embodiments, the method includes modifying the diameter or the shape of the X-ray beam with an aperture adaptor.

In some embodiments, the collimator is part of a collimator assembly comprising a collimator holder attached to the back-reflection Laue chamber, the method further comprising aligning the collimator with the through-hole.

In some embodiments, said aligning the collimator with the through-hole comprises slidably engaging the collimator with the collimator holder.

In some embodiments, the method further includes connecting the collimator holder to the back-reflection Laue chamber at a substantially 45-degree angle with regard to the reflective interior surface.

In some embodiments, the collimator is housed in a tube extending from the X-ray source to the collimator holder, the method further comprising slidably engaging the collimator into the collimator holder by sliding the tube into the collimator holder.

In some embodiments, the method further includes focusing the back-reflected visible radiation with a first lens; and detecting the focused back-reflected visible radiation with a camera.

In some embodiments, the method further includes intensifying the focused back-reflected visible radiation with an image intensifier; and refocusing the intensified focused back-reflected visible radiation with a second lens, the image intensifier and the second lens being positioned between the first lens and the camera. Alternatively, the second lens can be replaced by a fiber-optically coupled camera.

DETAILED DESCRIPTION

Figure 1:
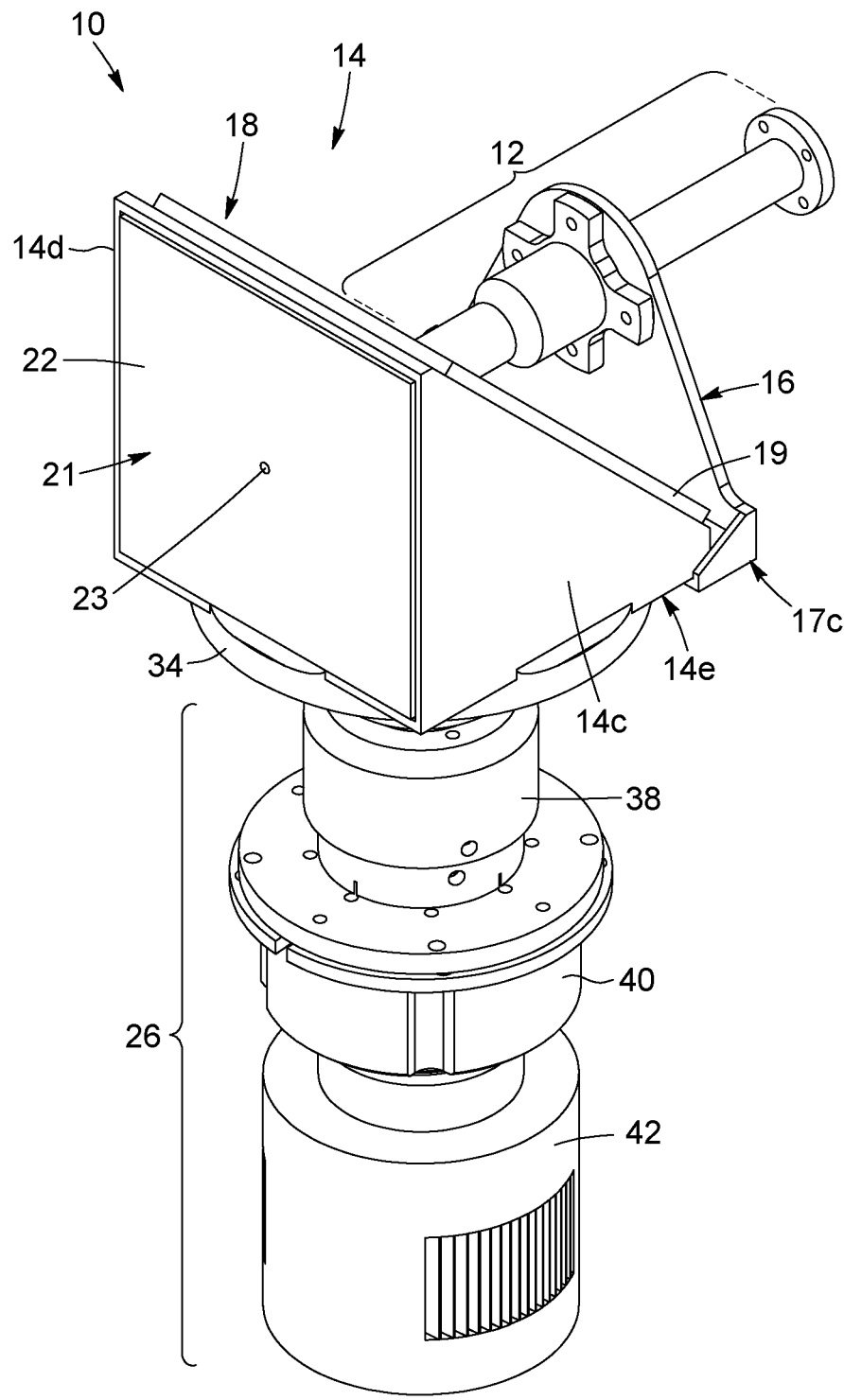
FIG. 1 is a perspective view of a back-reflection Laue apparatus according to an embodiment.
Figure 2:
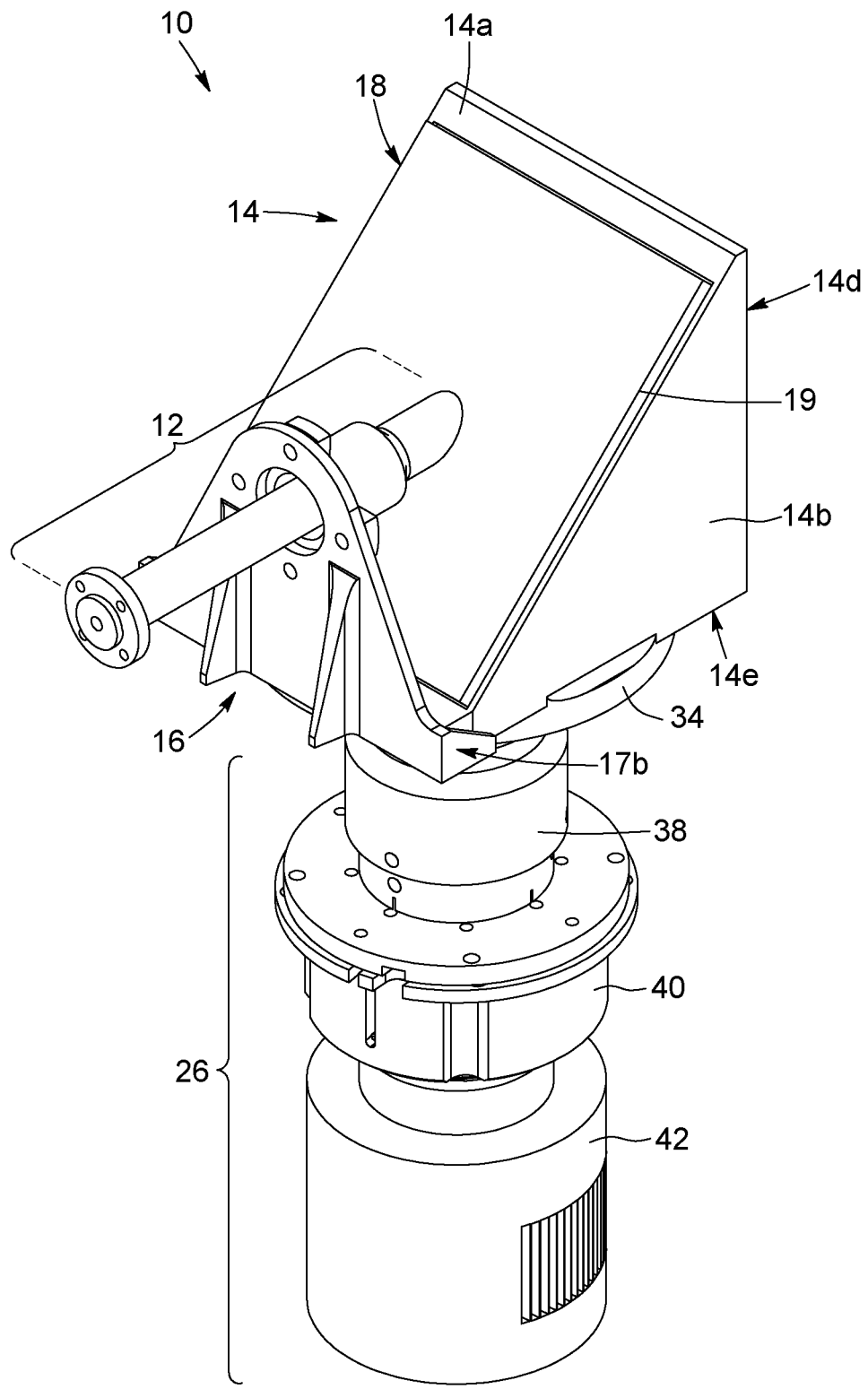
FIG. 2 is another perspective view of the back-reflection Laue apparatus of FIG. 1.

The present description provides a back-reflection Laue apparatus, and corresponding methods of operation. As will be described further herein, the back-reflection Laue apparatus of the present description includes a mirror assembly for reflecting Laue spots diffracted from a sample onto a scintillator or fluorescent layer, to a detector assembly. An X-ray source provides X-ray radiation to the back-reflection Laue systems by means of a collimator having a chamber end, the chamber end of the collimator being located within an aperture provided in the mirror assembly. Various embodiments of the back-reflection Laue apparatus and the collimator will be described in further detail herein.

Now referring to FIGS. 1 to 4, a back-reflection Laue apparatus 10 according to an embodiment of the present description is provided. In the embodiment shown, the apparatus 10 includes a collimator assembly 12 for housing and holding a collimator 13. The collimator 13 has a source end 13s connectable to an X-ray source (not shown on FIGS. 1 to 4) and a detector end 13a connectable to a reflection chamber 14. The collimator assembly 12 can be include a collimator holder 16 that can provide stability to the collimator assembly 12. In the embodiment shown, the collimator holder 16 can be attached to the reflection chamber 14 via connectors 17b, 17c at a substantially 45-degree angle with regard to the reflective interior surface. It is understood that other that the collimator holder 16 and the reflection chamber 14 can have a different relative angle. In some embodiments, the collimator holder 16 can be conveniently disconnected from the reflection chamber 14 when the back-reflection Laue apparatus is not in operation.

In the embodiment shown, the reflection chamber 14 has a triangular box shape and is made of several side walls joined together. Side wall 14a has a mirror assembly 18 provided thereon or embedded therein, the mirror assembly 18 having a mirror support plate 19 provided on an exterior side of the reflection chamber 14, and a mirror 20 provided on an interior side of the reflection chamber 14. The mirror assembly 18 also includes a through-hole, also referred to herein as a mirror through-hole 15, to receive the detector end 13a of the collimator 13 such that the X-ray beam exiting the collimator 13 first enters the reflection chamber 14 via the mirror through-hole 15. Side wall 14d is located on an opposite side of side wall 14a and has a scintillator assembly 21 provided thereon or embedded therein. The scintillator assembly 21 can include a support surface 22a made of an X-ray blocking material and transparent to visible light (for example, the X-ray blocking material can be leaded glass, or regular glass having a sufficient thickness) and a conversion screen 22b provided on an exterior side of the reflection chamber 14. In some embodiments, an X-ray transparent but light blocking film (typically a thin film) can seal the reflection chamber from environmental light. The scintillator assembly 21 also includes a through-hole, also referred to herein as a scintillator through-hole 23, to allow the collimated X-ray beam to exit the reflection chamber 14 and be directed towards a sample (not shown on FIGS. 1 to 4). Side walls 14b and 14c allow for joining side walls 14a and 14d together, and side wall 14e is provided with a hole 25 configured to accommodate a detector assembly 26.

In the embodiment shown, side wall 14a is provided with an angle α of about 45° with respect to the side wall 14d. However, it should be understood that this angle is not limited to 45°. For example, the angle α can be between about 35° and about 45°. When the angle is different than 45°, it should be understood that the shape of the reflection chamber, the distance between the mirror through-hole 15 and the scintillator through-hole 23, as well as the positioning of the hole 25 and the detector assembly 26 can vary compared to what is shown in the Figures, so that Laue spots can still be detected, as will be known to a person skilled in the art.

Figure 3A:
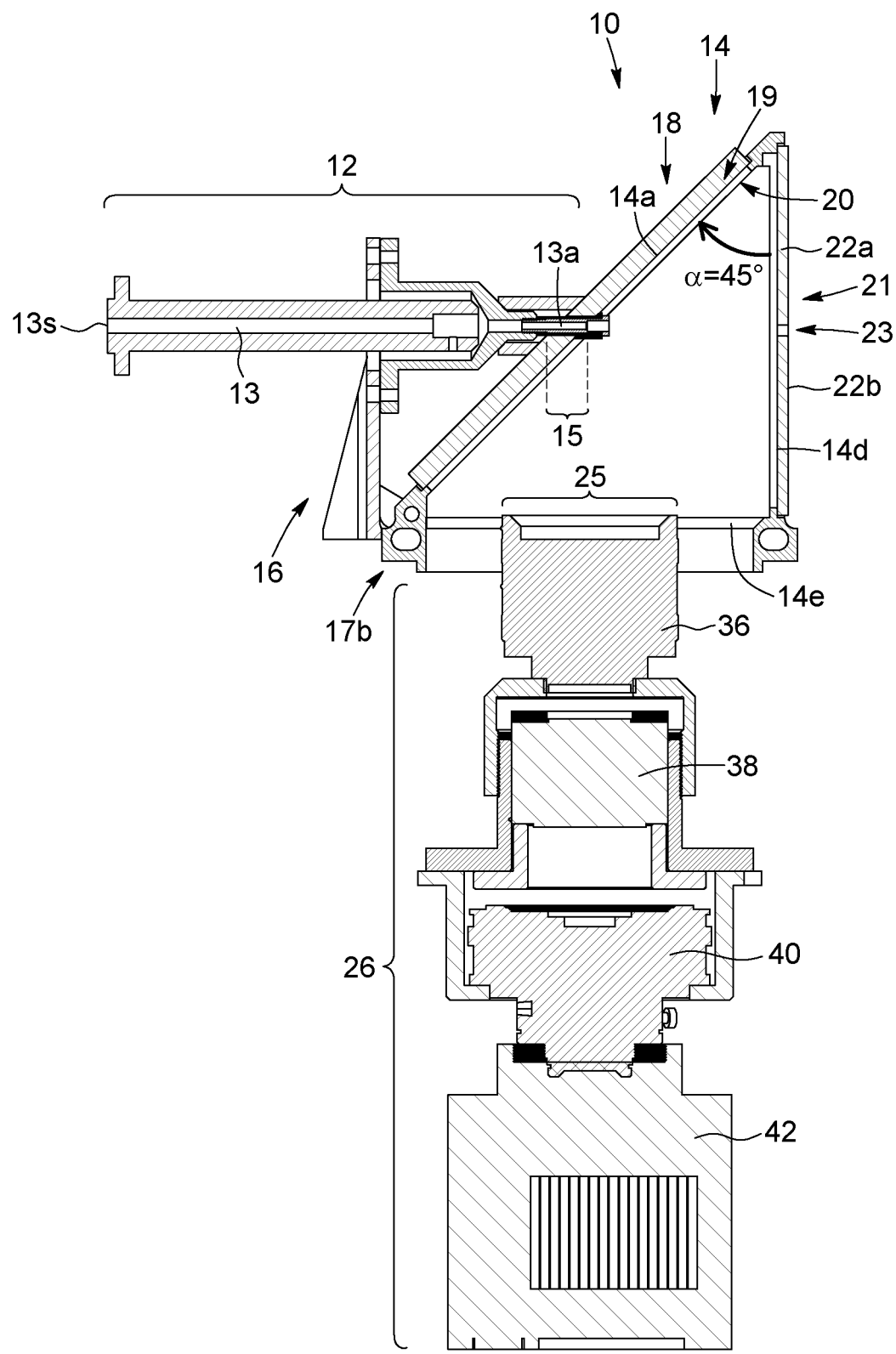
FIG. 3A is a cross-sectional view of the back-reflection Laue apparatus of FIG. 1.
Figure 3B:
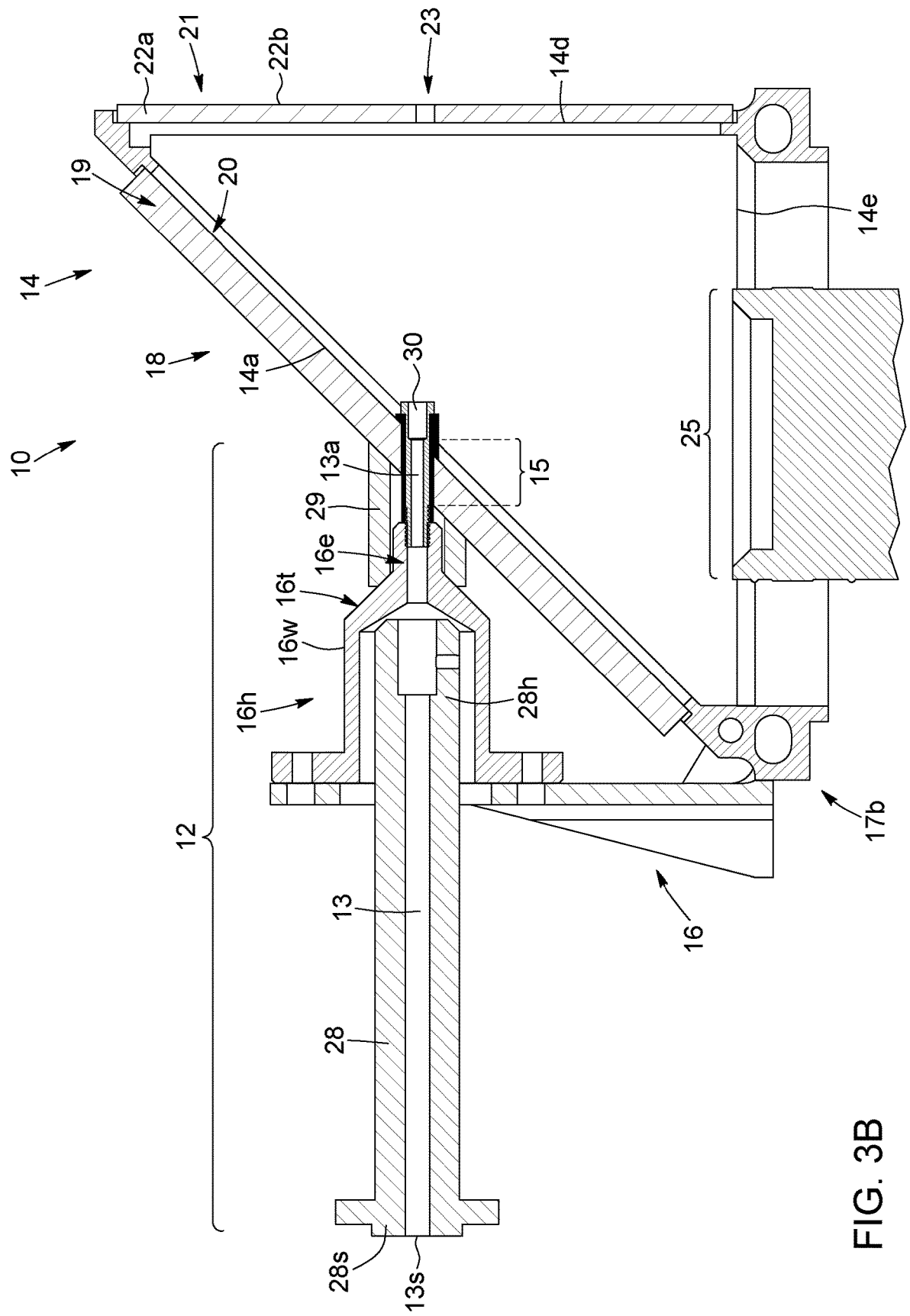
FIG. 3B is a partial cross-sectional view of the back-reflection Laue apparatus of FIG. 1, showing a close-up view of the collimator and the reflection chamber.
Figure 4:
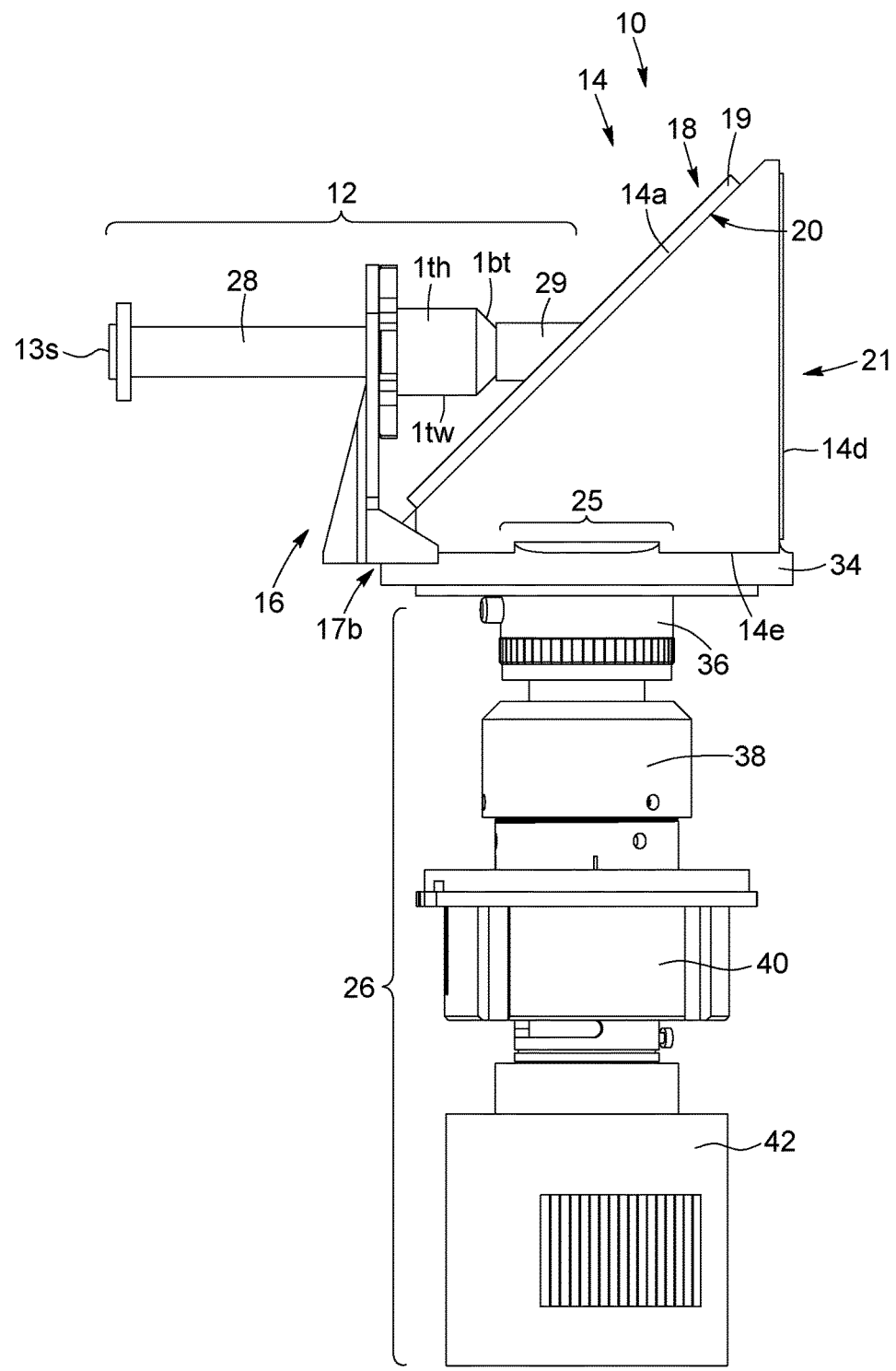
FIG. 4 is a side-elevation view of the back-reflection Laue apparatus of FIG. 1.

Now more specifically referring to FIGS. 3A and 3B, the collimator assembly 12 is mountable between an X-ray source and the reflection chamber 14. The collimator assembly 12 includes the collimator 13 that extends from the X-ray source to within the mirror through-hole 15 and can optionally further include several support pieces that can provide stability to the collimator 13, that can modify the properties of the X-ray beam exiting the collimator 13, and/or that can reduce the effect of external light. In the embodiment shown on FIGS. 3A and 3B, the collimator assembly includes the collimator 13 having a source end portion 13s and a mirror end portion 13a, that is provided in a tube 28. The tube 28 has a source end 28s and a holder end 28h that can be received in a collimator holder 16.

The collimator holder 16 is attached to the reflection chamber 14 at a junction between side walls 14a and 14e and extends upwardly to form a housing 16h into which the collimator 13 and the tube 28 can be housed. The collimator 13, housing 16h and mirror through-hole 15 are aligned such that the X-ray radiation entering the collimator 13 at its source end 13s can be collimated and introduced into the reflection chamber 14. The housing 16h of the collimator holder 16 has a wide portion 16w that is configured to receive the tube 28 (for example by sliding the tube 28 therein), a tapered portion 16t, and an end portion 16e. The tube 28 in which a portion of the collimator 13 is positioned, fits into the wide portion 16w of the housing 16h, with an end of the tube 28 contacting the tapered portion 16t. The collimator 13 exits the tube 28 via a hole provided in the tapered portion 16t and through the end portion 16e. The mirror end portion 13a of the collimator 13 then fits into the mirror through-hole 15 and terminates within the mirror through-hole 15. In the embodiment shown, the end portion 16e of the housing 16h is inserted into a guide 29 having an inner diameter corresponding to an external diameter of the end portion 16e. The guide 29 can also have an end that fits the tapered portion 16t. This can prevent external light from penetrating into the reflection chamber 14, and in some scenarios, can ensure that the collimator 28 and housing 16h are held at appropriate angles. In the embodiment shown on FIGS. 3A and 3B, the collimator 13 terminates at the mirror surface 20, and the collimator 13 is provided with an aperture adaptor 30 that can allow modifying the diameter of the aperture or the shape of the collimated X-ray beam.

Figure 6A:
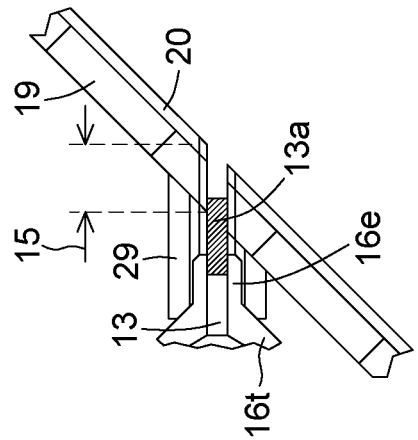
FIGS. 6A to 6E are partial cross-sectional views of the collimator of the back-reflection Laue apparatus according to embodiments of the present description, showing various positions of the end tip of the collimator within the mirror through-hole.
Figure 6B:
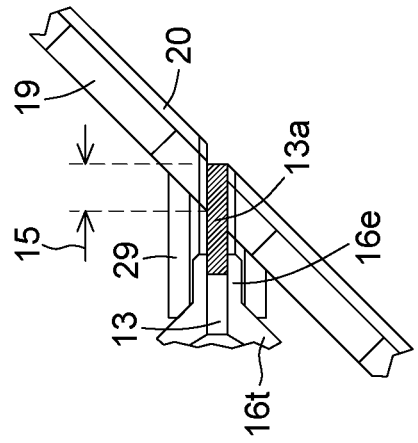
Figure 6C:
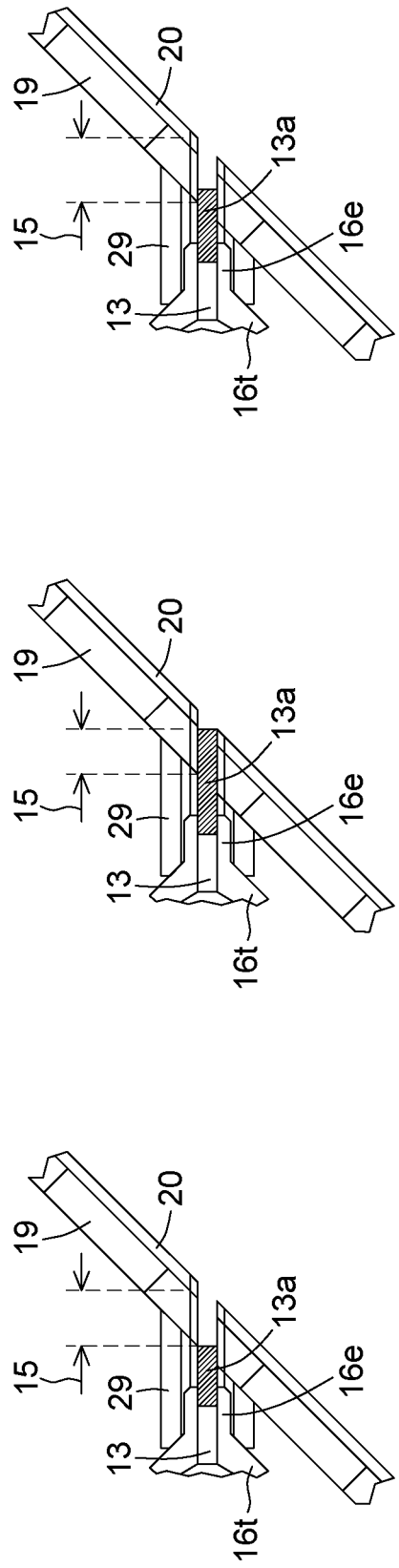
Figure 6D:
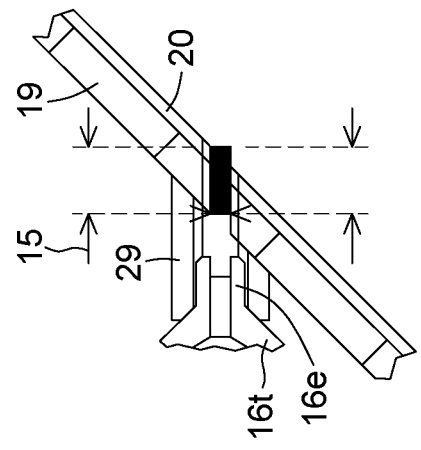

Now referring to FIGS. 6A to 6E, several partial cross-sectional views of the collimator of the back-reflection Laue apparatus according to embodiments of the present description are shown. FIGS. 6A to 6E show various possible positions of the mirror end portion 13a of the collimator 13 within the mirror through-hole 15. In the embodiment shown on FIG. 6A, the mirror end portion 13a terminates in a region that is proximate the entrance of the mirror through hole 15, while being located within the mirror through hole 15—in other words, the mirror end portion 13a terminates at or proximate to a surface region of the mirror support plate 19 and within the mirror through hole 15. In the embodiment shown on FIG. 6B, the mirror end portion 13a terminates in a region that is proximate the mirror 20, while being located within the mirror through hole 15—for example, the mirror end portion 13a can terminate at the primary surface of the mirror 15 as shown in FIG. 6B. In the embodiment shown on FIG. 6C, the mirror end portion 13a terminates substantially in a middle region of the mirror through hole 15. More generally, and as shown on FIG. 6D, the mirror end portion 13a can terminate in a zone 32 that is located between the surface of the mirror support plate 19 and the mirror 20.

Figure 6E:
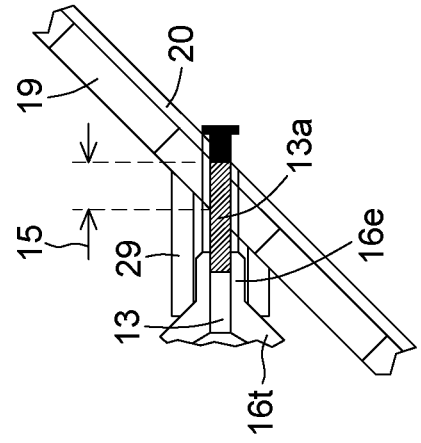

In the embodiment shown on FIG. 6E, the mirror end portion 13a terminates at the surface of the mirror 20 and is provided with an aperture adaptor 30 that can modify the diameter and/or shape of the X-ray beam. More specifically, the aperture adapter 30 can hold the end of the collimator that fits inside the through hole 15 and defines the shape and size of the beam. It should be understood that the aperture adaptor 30 does not collimate the X-ray beam further and does not extend substantially within the reflection chamber 14. For example, the aperture adaptor 30 has an end that contacts the surface of the mirror 20 in close proximity to the mirror through hole 15, such that the aperture adaptor 30 does not create a shadowing during collection of Laue spots. It should be understood that in some embodiments, the mirror end portion 13a can be free of the aperture adaptor 30 and can be strictly positioned within the mirror through hole 15, without any part or attachment thereof protruding into the reflection chamber 14. In some scenarios, the aperture adaptor 30 is removable and/or replaceable to allow for different X-ray beam sizes. For example, a larger aperture can allow for more X-ray flux, which typically makes the reflections more intense but affords less accurate measurements (i.e., a larger aperture typically results in larger spots). Correspondingly, a smaller aperture can allow for more accurate measurements due to smaller reflection size, but the reflections are less intense. In some embodiments, at least one of the sidewalls 14b, 14c and 14e are removable so as to allow the aperture adaptor 30 to be removed and/or replaced.

Now referring back to FIGS. 1 to 4, in the embodiment shown, the side wall 14d has a scintillator assembly 21 provided thereon or embedded therein. The scintillator assembly 21 includes a support surface 22a made of an X-ray blocking material (such as leaded glass) and a conversion screen 22b provided on an exterior side of the reflection chamber 14. The conversion screen 22b, also referred to herein as the scintillator screen 22b or the fluorescent screen 22b, is X-ray absorptive and can be made of any material that converts X-ray radiation to visible radiation. For instance, the conversion screen 22b can include a phosphor on Mylar substrate (e.g., having a thickness between 20 μm and 60 μm, or of about 40 μm) which can convert X-ray radiation to visible radiation.

Preferably, a light-blocking layer can also be provided on the external side of the conversion screen 22b (such as black paper or black Kapton™) in order to prevent external light from entering the reflection chamber 14. In some scenarios, optional filters may be provided on the conversion screen 22b, which are suitable for the materials under study. In some scenarios, external interchangeable filters may also be provided on the conversion screen 22b. The scintillator through-hole 23 provided on the scintillator assembly 21 is aligned with the mirror through-hole 15 and the collimator 13. The scintillator through-hole 23 can have various diameters, similarly to the aperture adaptor 30.

In some embodiments, the support surface 22a is made of an X-ray blocking material, such as glass (e.g.; leaded glass) or any other support structure suitable for the application of interest. The support surface 22a blocks any divergent primary X-ray signal from exciting the conversion screen 22b. Preferably, the conversion screen 22b is arranged perpendicular to the X-ray beam.

In some embodiments, the mirror 20 can be made of a reflective material that is able to reflect visible radiation. For example, the mirror 20 can include one or more reflective metal layers such as an aluminum layer or a silver layer. One non-limiting example of material that can be used as a layer of the mirror is a front-silvered low distortion mirror.

Still referring to FIGS. 1 to 4, in some embodiments, the detector assembly 26 is connected to the reflection chamber 14 via a cylindrical joint 34 coupled to the hole 25 of the reflection chamber 14. In the embodiment shown, the detector assembly 26 includes a first lens 36 (also referred to herein as a primary lens 36) that directly receives the visible radiation back-reflected from the mirror 20, an image intensifier 38 that can speed-up measurements, a second lens 40 to focus the intensified image from the intensifier 38 (or alternatively the second lens may be replaced by a fiber-optic connection between image intensifier and CCD or CMOS), and a CCD or CMOS camera 42. It should be understood that other types of detector assemblies can be used. For example, some detector assemblies do not include an image intensifier and second lens. The CCD or CMOS camera can be a cooled CCD or CMOS camera when no intensifier is used.

Figure 5:
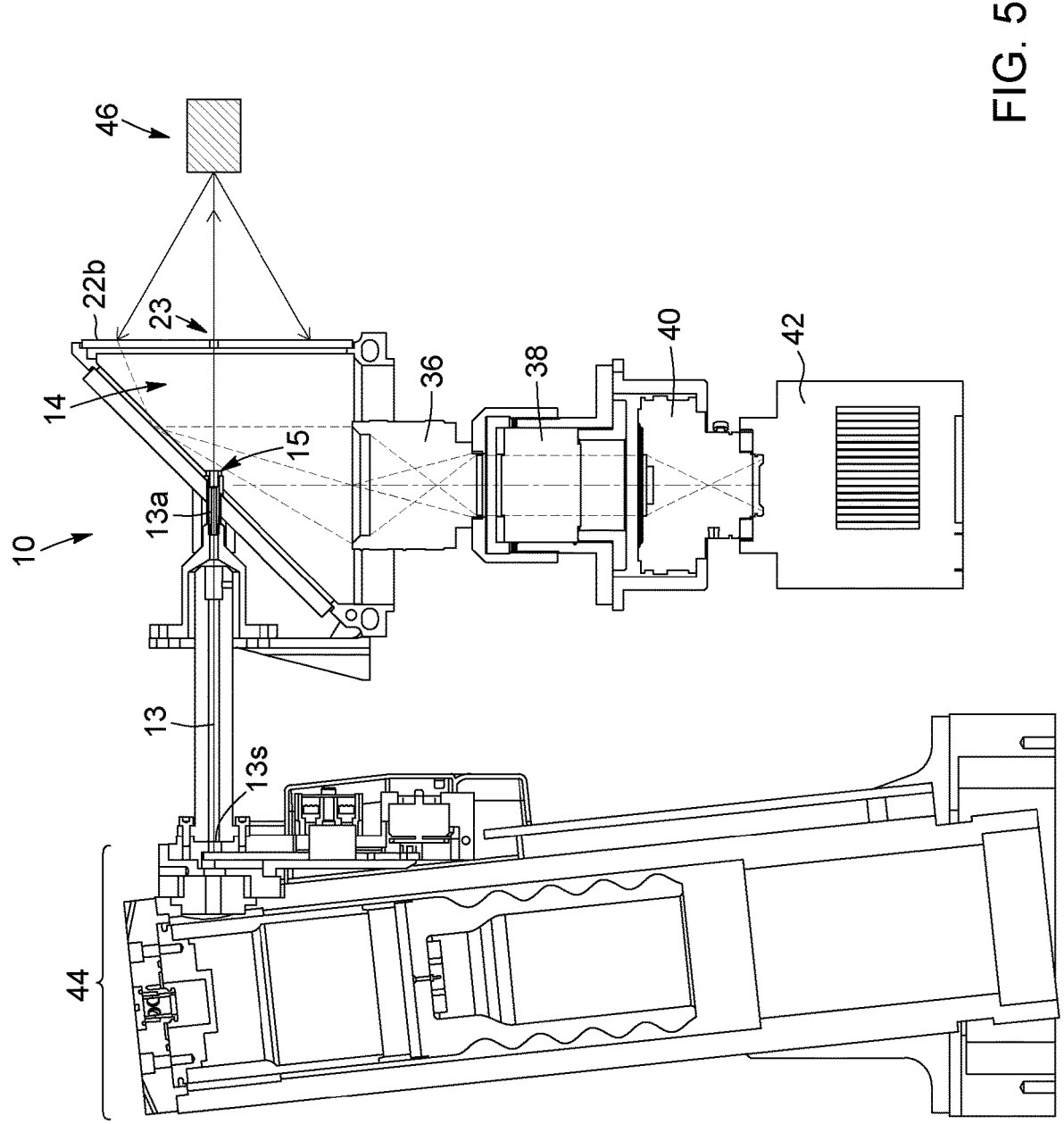
FIG. 5 is a schematic view of the back-reflection Laue apparatus of FIG. 1, connected to an X-ray source.

Now referring to FIG. 5, a back-reflection Laue apparatus 10, according to an embodiment of the present description, is shown connected to an X-ray source 44. A sample 46 is also shown located on the right side of the back-reflection Laue apparatus 10. The X-ray radiation emitted from the X-ray source 44 enters the collimator 13 via the source end 13s thereof. The X-ray beam is collimated by the collimator 13, enters the reflection chamber 14 via the mirror through hole 15 after exiting the collimator 13 at a collimator tip end that is located within the through hole 15, and exits the reflection chamber via the scintillator through hole 23. The X-ray beam is then projected onto the surface of the sample 46 and diffracted. A portion of the diffracted radiation contacts the scintillator screen 22b and is converted to visible radiation that enters the reflection chamber 14. The visible radiation entering the reflection chamber 14 is reflected off of the mirror 20 and onto the first lens 36 before being optionally processed through the image intensifier 38 and the second lens 40 and being captured by the CCD or CMOS camera 42. The image captured by the CCD or CMOS camera 42 can then be processed by a processing unit (e.g., a computer, not shown) and rendered for the user to see.

In accordance with another aspect, there is also provided a back-reflection Laue method. The method includes generating X-ray radiation with an X-ray source and collimating the X-ray radiation into an X-ray beam with a collimator. After these steps, the method also includes, in a back-reflection Laue chamber comprising a reflection side wall having an exterior surface and a reflective interior surface, transmitting the X-ray beam through the back-reflection Laue chamber and towards a sample. Once this step has been carried out, the method includes back-reflecting, with the reflective interior surface, visible radiation obtained from the X-ray beam being diffracted off the sample and converted to visible radiation upon re-entering the back-reflection Laue chamber, the reflection side wall being provided with a through-hole extending from the exterior surface to the reflective interior surface. A step of detecting the back-reflected visible radiation with a detector can then be performed. In nearly all implementations of the method, the collimator has a first end connected to the X-ray source and a second end terminating between the exterior surface and the reflective interior surface of the first side wall, within the through-hole, the X-ray beam exiting the collimator at the second end thereof.

In some embodiments, the method further includes modifying the diameter or the shape of the X-ray beam with an aperture adaptor.

In some embodiments, the collimator is part of a collimator assembly comprising a collimator holder attached to the back-reflection Laue chamber, and the method further includes aligning the collimator with the through-hole. The collimator can be slidably engaged with the collimator holder.

In some embodiments, the method includes connecting the collimator holder to the back-reflection Laue chamber at a substantially 45-degree angle with regard to the reflective interior surface.

In some embodiments, the collimator is housed in a tube extending from the X-ray source to the collimator holder. The method can include slidably engaging the collimator into the collimator holder by sliding the tube into the collimator holder.

In some embodiments, the method includes focusing the back-reflected visible radiation with a first lens and detecting the focused back-reflected visible radiation with a camera. The method can also include intensifying the focused back-reflected visible radiation with an image intensifier and refocusing the intensified focused back-reflected visible radiation with a second lens or fiber optic, the image intensifier and the second lens or fiber optic being positioned between the first lens and the camera.

Several alternative embodiments and examples have been described and illustrated herein. The embodiments described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. The present examples and embodiments, therefore, are to be considered in all respects as illustrative and not restrictive. Accordingly, while specific embodiments have been illustrated and described, numerous modifications come to mind without significantly departing from the scope defined in the appended claims.

The invention claimed is:

1. A back-reflection Laue apparatus, comprising:
   an X-ray source for generating X-ray radiation;
   a collimator for collimating the X-ray radiation into an X-ray beam;

a back-reflection Laue chamber for transmitting the X-ray beam therethrough towards a sample, and back-reflecting visible radiation, obtained from the X-ray beam being diffracted off the sample and converted to visible radiation, upon re-entering the back-reflection Laue chamber, the back-reflection Laue chamber comprising a reflection side wall having an exterior surface and a reflective interior surface for back-reflecting the visible radiation, the reflection side wall being provided with a through-hole extending from the exterior surface to the reflective interior surface; and a detector assembly for detecting the back-reflected visible radiation, wherein the collimator has a first end connected to the X-ray source and a second end terminating between the exterior surface and the reflective interior surface of a first side wall, within the through-hole, the X-ray beam exiting the collimator at the second end thereof.

2. The back-reflection Laue apparatus of claim 1, wherein the second end of the collimator terminates at the exterior surface of the reflection side wall.

3. The back-reflection Laue apparatus of claim 1, wherein the second end of the collimator terminates at the reflective interior surface of the reflection side wall.

4. The back-reflection Laue apparatus of claim 1, wherein the second end of the collimator terminates strictly between the exterior surface and the reflective interior surface of the reflection side wall.

5. The back-reflection Laue apparatus of claim 4, wherein the second end of the collimator terminates substantially in the middle of the through-hole.

6. The back-reflection Laue apparatus of claim 1, wherein the second end of the collimator is provided with an aperture adaptor for modifying the diameter and/or shape of the X-ray beam.

7. The back-reflection Laue apparatus of claim 1, wherein the collimator is part of a collimator assembly comprising a collimator holder attached to the back-reflection Laue chamber and configured to receive the collimator therein such that the collimator and the through-hole are aligned.

8. The back-reflection Laue apparatus of claim 7, wherein the collimator is slidably engageable into the collimator holder.

9. The back-reflection Laue apparatus of claim 7, wherein the collimator holder is connected to the back-reflection Laue chamber at a substantially 45-degree angle with regard to the reflective interior surface.

10. The back-reflection Laue apparatus of claim 7, wherein the collimator is housed in a tube extending from the X-ray source to the collimator holder, the collimator being slidably engageable into the collimator holder by sliding the tube into the collimator holder.

11. The back-reflection Laue apparatus of claim 7, wherein the collimator assembly further comprises a guide protruding from the exterior surface of the reflection side wall and configured to surround an end portion of the collimator and the collimator holder to prevent external light from entering the back-reflection Laue chamber.

12. The back-reflection Laue apparatus of claim 1, wherein the reflective interior surface comprises a reflective metal layer.

13. The back-reflection Laue apparatus of claim 12, wherein the reflective metal layer is selected from the group consisting of an aluminum layer and a silver layer.

14. The back-reflection Laue apparatus of claim 1, wherein the detector assembly comprises a first lens for focusing the back-reflected visible radiation, and a camera to detect the focused visible radiation.

15. The back-reflection Laue apparatus of claim 14, further comprising an image intensifier to intensify the focused visible radiation, and a second lens to refocus the intensified visible radiation, the image intensifier and the second lens being positioned between the first lens and the camera.

16. The back-reflection Laue apparatus of claim 14, wherein the camera is a CCD camera or a CMOS camera.

17. A back-reflection Laue chamber connectable to an X-ray source for generating X-ray radiation, a collimator for collimating the X-ray radiation into an X-ray beam and a detector assembly for detecting back-reflected visible radiation, the back-reflection Laue chamber comprising:

a reflection side wall having an exterior surface and a reflective interior surface for back-reflecting the visible radiation, the reflection side wall being provided with a through-hole extending from the exterior surface to the reflective interior surface, the back-reflection Laue chamber being configured to transmit the X-ray beam therethrough towards a sample, and back-reflecting visible radiation, obtained from the X-ray beam being diffracted off the sample and converted to visible radiation, upon re-entering the back-reflection Laue chamber, wherein the through-hole is adapted to receive therein an end portion of the collimator terminating between the exterior surface and the reflective interior surface of a first side wall, the X-ray beam exiting the collimator via the end portion.

18. The back-reflection Laue chamber of claim 17, further comprising a collimator holder attached to the back-reflection Laue chamber and configured to receive the collimator therein such that the collimator and the through-hole are aligned.

19. The back-reflection Laue chamber of claim 18, wherein the collimator holder is connected to the back-reflection Laue chamber at a substantially 45-degree angle with regard to the reflective interior surface.

20. The back-reflection Laue chamber of claim 18, further comprising a guide protruding from the exterior surface of the reflection side wall and configured to surround the end portion of the collimator and the collimator holder to prevent external light from entering the back-reflection Laue chamber.

21. The back-reflection Laue chamber of claim 17, wherein the reflective interior surface comprises a reflective metal layer.

* * * * *